G. H. WHITTINGHAM.
THERMOSTATIC SWITCH.
APPLICATION FILED DEC. 20, 1917.

1,380,168.

Patented May 31, 1921.

Inventor
G. H. Whittingham

By Watson & Boyden
Attorneys

UNITED STATES PATENT OFFICE.

GEORGE H. WHITTINGHAM, OF BANCROFT PARK, MARYLAND, ASSIGNOR TO MONITOR CONTROLLER COMPANY OF BALTIMORE, A CORPORATION OF MARYLAND.

THERMOSTATIC SWITCH.

1,380,168.  Specification of Letters Patent.  Patented May 31, 1921.

Application filed December 20, 1917. Serial No. 208,172.

*To all whom it may concern:*

Be it known that I, GEORGE H. WHITTINGHAM, a citizen of the United States, residing at Bancroft Park, in the county of Baltimore and State of Maryland, have invented certain new and useful Improvements in Thermostatic Switches, of which the following is a specification.

The purpose of this invention is to provide an efficient and reliable switching mechanism, controlled by a thermostat, for starting and stopping electric motors used in operating cooling or refrigerating apparatus, to regulate the temperature in the room or place where the thermostat is located. The invention comprises a switch for opening and closing the control circuit of a motor, a member for moving said switch to on and off positions, electromagnetic devices for shifting said member from one position to the other, a thermostatic switch for initially closing the circuits of one or the other of the magnetic devices when the temperature varies from normal, and means independent of the thermostatic switch for maintaining a flow of current through the coils of said devices while the latter are actuating the switch moving member. In carrying out my invention, I employ a current of low voltage and small quantity, which may be supplied from three or four cells of dry battery, for energizing the magnets. This is desirable for the reason that the magnet circuits are initially closed by the thermostatic switch, which operates very slowly, and which would be injured by a current of any considerable voltage or quantity. After the initial closure of a magnet circuit, the magnet operates the motor control switch instantly and the current is then cut off, and because of the small consumption of current the ordinary dry cell battery will suffice to operate the mechanism for many months.

Figure 1:
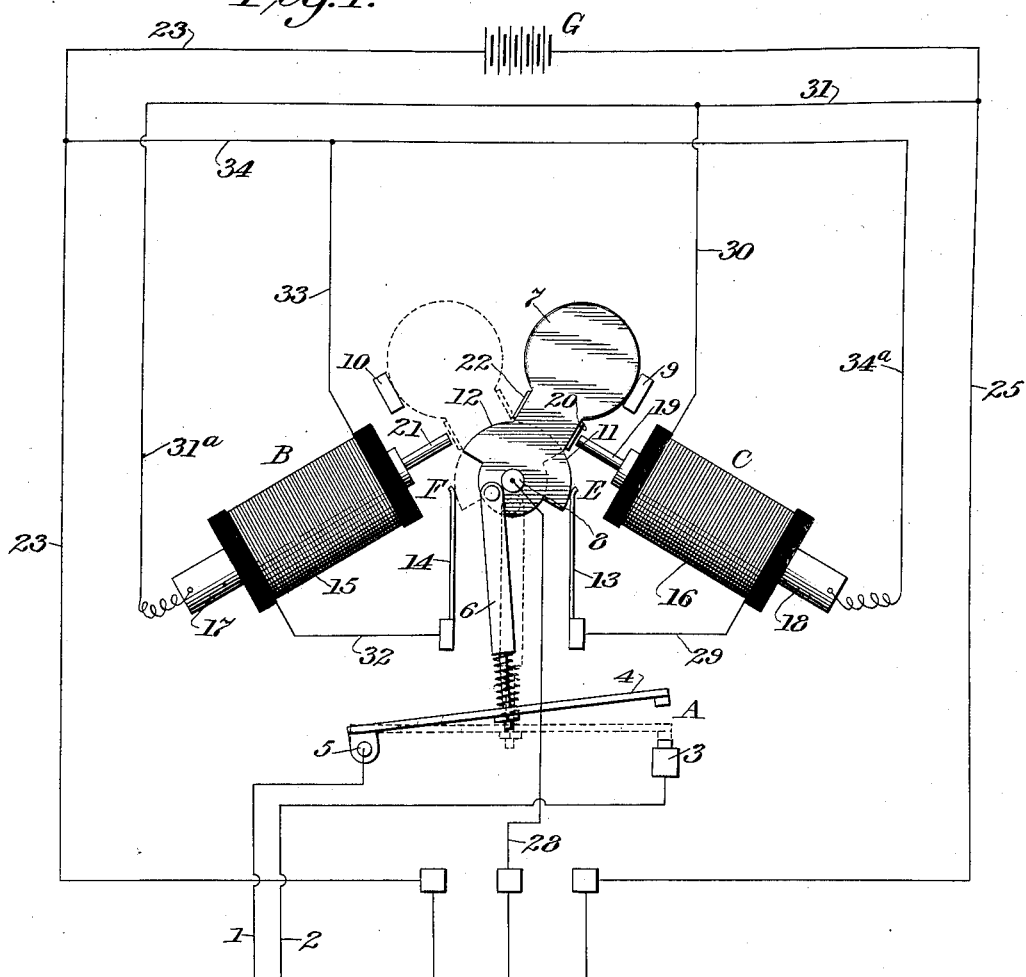
Figure 2:
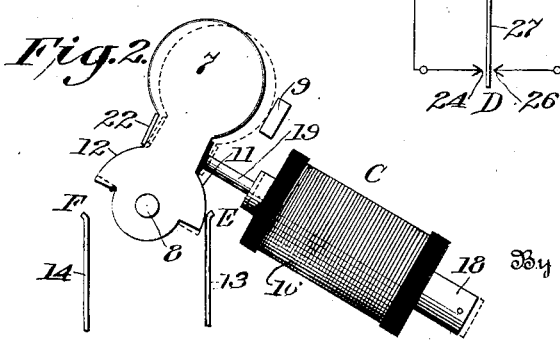

In the acompanying drawing, which illustrates the invention,

Figure 1 is a front view of the apparatus, the circuits being shown in diagram; and Fig. 2 is a detail view illustrating the operation of the mechanism.

Referring to the drawing, A indicates a switch for opening and closing the control circuit 1—2 of an electric motor (not shown) for operating a refrigerating machine, or other temperature regulating apparatus. The switch A comprises a stationary contact 3 and a movable switch member 4, which is illustrated as an arm or lever pivoted at the point 5. This arm is connected by a link 6 to a weighted lever 7, which latter is pivoted below its center of mass on the pivot 8 and is adapted to swing from the stop 9 to the stop 10. When the weighted lever rests against the stop 9, the switch A is open, as shown in full lines, and when said lever rests against the stop 10, the switch A is closed, as shown in dotted lines.

The weighted lever is thrown from one position to the other by magnets B and C, the circuits of which are controlled primarily by a switch D, operated by a thermostat shown in the drawings and so marked. The weighted lever 7 has two arcuate contact surfaces 11 and 12, adapted to be engaged by spring contacts 13 and 14, respectively, according to the position of said lever. The surface 11 and contact member 13 constitute a switch E for completing the circuit from the thermostat through the magnet C when the weighted member 7 is in the position shown in full lines and for interrupting the circuit through said magnet when said lever is thrown over its center into the position shown in dotted lines. Similarly, the contact surface 12 and the spring switch arm 14 constitute a switch F for completing the circuit from the thermostat through the magnet B when the weighted member 7 is in the position shown in dotted lines and for interrupting said circuit when said lever is thrown into the position shown in full lines.

The magnets B and C are shown in the form of solenoids comprising coils 15 and 16 and cores 17 and 18, respectively, the magnets being inclined so that the cores may move downward by gravity when the magnets are deënergized. The core 18 has, projecting from its upper end, a metal push rod 19, adapted to engage a contact surface 20 on the side of the weighted lever 7, when the core moves upward, and this push rod electrically connects the lever 7 and core 18 when the latter moves upward, the push rod actuated by the core also serving as the mechanical means for throwing the weighted lever over its center. Similarly, a metal push rod 21, secured to the core 17, is adapted to engage a contact surface 22 on the lever 7 when said lever is in the dotted line position and the core 17 is moved to force the push rod against the contact 22. This push rod 21 is adapted to electrically connect the core 17 with the lever 7, as well as to mechanically move said lever when the core 17 is drawn upward.

The current source for operating the magnets is shown at G and may consist of a few cells of dry battery, since each operation of the mechanism requires only a momentary closure of the circuit and a small amount of energy which is efficiently utilized. From one pole of the battery a conductor 23 leads to the contact 24 of the thermostat switch D, and from the other pole of the battery a conductor 25 leads to the contact 26 of the thermostat switch D. The thermostat comprises an arm 27, which stands between and out of contact with the fixed contacts 24 and 26, when the temperature is normal, and moves into engagement with one or the other of said fixed contacts with a rise or fall in temperature in the place where the thermostat is located. If the temperature rises, the arm 27 will engage the contact 24, and if the temperature falls below the normal, the arm will engage the contact 26. The arm 27 is connected by conductor 28 to the pivot 8 of the weighted lever 7, and when said lever is in the full line position shown in Fig. 1, the circuit is continued through said lever and switch E to conductor 29, thence through coil 16 of magnet C, and thence through conductors 30 and 31 to the conductor 25 and thence to the current source G. When this circuit is completed at the switch E through the coil 16, it will be noted that the switch F is open and hence no current can pass through the coil 15 of magnet B. When the weighted lever is thrown over into the dotted line position, the circuit through coil 16 will be interrupted at switch E and the circuit through coil 15 will be made up at switch F from conductor 28, through said switch and conductor 32 to said coil 15, thence through conductors 33 and 34 to conductor 23 leading to the current source.

The core 17 of magnet B is connected by conductors 31ª, 31 and 25 to one side of the battery G, and the core 18 is connected by conductors 34ª, 34, and conductor 23 to the opposite pole of the battery G.

In operation, assuming the parts to be in the position shown in full lines in Fig. 1, if the temperature in the room rises above the normal, the contact arm 27 of the thermostat will move to the left and engage the contact 24, thus establishing a circuit from one pole of the battery through conductor 23, contact 24, arm 27, and conductor 28 to the weighted lever 7; thence through switch E and conductor 29 to the coil 16 of magnet C, and thence by conductors 30—31, and 25 to the opposite pole of the battery. The magnet C will be instantly energized and the upward movement of its core will force the push rod 19 into engagement with the contact 20 and thereupon a circuit through the coil 16 will be established in shunt or in parallel to that passing through the thermostat switch contacts 24 and 27, this parallel circuit extending from conductor 23, through conductors 34 and 34ª to the core 18, thence through push rod 19 and contact 20 to lever 7; thence through switch E and conductor 29 to coil 16 and thence through conductors 30—31 and 25 to the opposite pole of the current source. Thus, when a circuit has been initially established through the magnet coil 16 at the thermostat switch, a circuit shunting said switch is established through said coil, which circuit is maintained at the contacts 19 and 20 so long as the core of the magnet C is moving upward to force the weighted lever 7 over its center. It will be evident that if reliance were placed upon the thermostat contacting devices for supplying current to the coil 16 during the movement of the magnet core, the action of the core would be unreliable because the thermostat contact is so gradually made; but with the present apparatus, the thermostat is only relied upon to initially close the magnet circuit and the shunt circuit described is then maintained for the operation of the magnet until the magnet core completes its upward movement and the weighted lever has acquired the momentum necessary to carry the latter over its center to its opposite position. As the lever passes over the center, the circuit through the magnet 16 is broken at the switch E and a circuit through the magnet 15 is made up, from the thermostat at the switch F. No current, however, can flow through the magnet 15 until the temperature falls below normal, when the thermostat arm 27 will engage the contact 26. When this occurs, current will flow from the battery, through conductor 25 to thermostat switch members 26 and 27, thence through conductor 28 and lever 7 to switch F, thence through conductor 32 to coil 15, and thence through conductors 33, 34 and 23 to the opposite pole of the current source. Immediately when the circuit just traced is closed, the magnet 15 will retract its core and the push rod 21 will engage contact 22, thus completing a circuit through coil 15, which is in parallel to the switch contacts 26 and 27, said shunt or parallel circuit extending from conductor 25, through conductors 31 and 31ª, to the core 17, thence through push rod 21 and contact 22 to lever 7, thence through switch F and conductor 32 to magnet coil 15, and thence through conductors 33, 34, and 23 to the current source G. This latter circuit will be maintained while the magnet core 17 is moving upward and throwing the lever 7 over its center from left to right in the drawing. As the lever passes over the center, the circuit for the magnet 16 is broken at the switch F and a circuit for the magnet 16 is made up at the switch E. However, no current can flow through the latter magnet until the temperature rises above normal and the thermostat arm 27 engages the contact 24. The action of one of the magnets in closing the parallel circuit through the weighted lever while the latter is being thrown over its center, is illustrated by the dotted and full line positions in Fig. 2.

It will be understood that when the temperature rises above normal in the room where the thermostat is placed, the apparatus described will cause the switch A to be closed, thereby starting the motor and the refrigerating apparatus, to lower the temperature; and when the temperature goes below normal the mechanism described will cause the switch A to open, thus breaking the motor control circuit and stopping the motor.

While I have shown a weighted lever as the means for directly operating the switch to be controlled, the switch may be operated by other devices movable back and forth from one position to another by the magnets placed on opposite sides thereof.

For convenience, the switch to be controlled, indicated at A in the drawing, or any object to be moved by the lever 7, will be referred to in the claims as the controlled member.

The invention will be found useful in connection with various kinds of switches for initially closing the magent circuits, and especially in connection with slow-moving automatic circuit closers other than thermostat switches, as for instance, switches controlled by floats in water tanks and the like. Such a switch may obviously be substituted for the thermostat switch when the mechanism is used to control an electric motor employed to operate a pump for filling a tank.

What I claim is:

1. The combination with a controlled member and a magnet for actuating the same, of a circuit for the magnet including a thermostat switch, means operated by the magnet for establishing a circuit through its coils in shunt to the thermostat switch after the latter has closed, and means also operated by the magnet for interrupting the circuit to the thermostat switch after the controlled member has been actuated.

2. The combination with a controlled switch and an operating member therefor, of a pair of magnets for throwing said member to the on and off positions, respectively, circuits for said magnets including a thermostat switch, switches operated by said member for connecting the magnets alternately to the thermostat switch, and switches operated by the magnets, when energized, for shunting the thermostat switch.

3. The combination with a controlled switch and an operating member therefor, of a pair of magnets disposed on opposite sides of said member and having armatures adapted to move said mamber in opposite directions, circuits for said magnets including a thermostat switch, switches operated by said member for connecting the magnets alternately to the thermostat switch, and two switches, each comprising a contact on said member and a contact movable by one of said armatures into engagement therewith, said latter switches each adapted to close a shunt around the thermostat switch.

4. The combination with a controlled member and a magnet for actuating the same of a circuit for the magnet including a switch, means operated by the magnet for establishing a circuit for the magnet in shunt to said switch immediately upon the closure of said switch, and means operated by the magnet for deënergizing the magnet after it has moved the controlled member.

5. The combination with a controlled member and a magnet for actuating the same of a circuit for the magnet including a switch, means operated by the magnet for establishing a circuit through its coils in shunt to said switch after said switch has closed, and means also operated by the magnet, for interrupting the circuit to said switch after the controlled member has been actuated.

In testimony whereof I have affixed my signature.

GEORGE H. WHITTINGHAM.